April 18, 1961      B. D. WHITE      2,979,775
METHOD OF MANUFACTURING CELLULAR PRODUCTS
Filed May 11, 1953

*INVENTOR.*
BENJAMIN D. WHITE
BY
ATTYS.

United States Patent Office 2,979,775
Patented Apr. 18, 1961

2,979,775

METHOD OF MANUFACTURING CELLULAR PRODUCTS

Benjamin D. White, Wadsworth, Ohio, assignor to The Bearfoot Sole Company, Inc., Wadsworth, Ohio, a corporation of Ohio Filed May 11, 1953, Ser. No. 354,091

3 Claims. (Cl. 18—53)

This invention relates to a new and improved method of manufacturing cellular products of rubber or rubber-like materials. The procedure shown and described herein presents many advantages over those methods in use at the present time, both in economies of operation and in improved properties of the product.

While the method has been perfected in the manufacture of soles and heels and will be described mainly in connection with the manufacture of those products, it is by no means limited to that field but may be used for the manufacture of all types of products made of cellular rubber, or rubber-like materials.

The customary or prior method now employed in the manufacture of cellular rubber or rubber-like products is to place a slab or block of uncured stock in a mold or molding cavity and to give the stock a first or preliminary heat which will be sufficient to decompose the blowing agent and impart sufficient rigidity to the stock. The amount of stock placed in a cavity is sufficient to fill or substantially fill the entire cavity. The first heating will set up the stock so that when the mold is opened the stock will "blow," i.e., expand in size due to the internal pressure created within the stock by the decomposition of the blowing agent.

In the prior method, after the stock in its expanded condition has cooled to room temperature, which is accompanied by undesirable and unavoidable shrinkage of the stock, it is subjected to a second heat treatment which further sets the stock to its final condition. This second heating may be performed in a second mold, or the stock may be placed on open racks in an autoclave and subjected to open steam at suitable pressures. After the process is completed, the soles, heels, or other articles are cut out from the stock.

One of the major objections to the process as above outlined is the great loss due to irregularity in the expansion of the stock. The losses attributable to the trimming and cutting operations in carrying on the process to any commercial extent are a major part of the cost of manufacturing soles, heels, gaskets or other articles. It is also very difficult to control the density of the product due to the fact that the expansion takes place in the open and the sheet or stock is not controlled or restricted in any way. Also the articles will shrink to varying degrees while in storage or after being placed on shoes.

By practicing the process of the present invention, these objections are overcome and it is possible to manufacture cellular rubber or rubber-like products without any loss at all due to trimming and cutting operations. The articles are substantially of constant and uniform density and no appreciable variations from piece to piece will be found. A result which is most astonishing is that there is little or no shrinkage in the finished product. The ability to sell a quantity of finished soles or heels to the shoe manufacturer and not have significant shrinkage as to cause any rejections is an immense gain and improvement in this field.

When the shoe soles are to be assembled on shoes, the side next to the shoe is coated with a cement and the soles are passed beneath powerful heat lamps which dry the cement to its proper tackiness. These lamps exert a powerful shrinking action on the articles, no matter how carefully the manufacturer tries to correct this condition. For some reason, which is not clear, soles made by the improved process do not shrink when subjected to the heat lamps.

One of the important advantages of the invention is in the manufacture of heels. It has been impractical heretofore to make rubber heels which are to be nailed to the shoes from highly blown stocks because it has been impossible, due to the expansion of the stock to maintain the nail washers in proper position. Accurate positioning of the washers in a rubber heel is vital because in modern shoe factories all the nails for a heel are driven into the shoe at one time by automatic nailing machines. If any washer is out of register with its hammer, or if a washer is above or below its proper position, the shoe may be rejected as a second, or if passed, the misplaced washer will later cause trouble.

With the former attempts to manufacture heels from high grade blown cellular rubber, the sudden and very substantial expansion of the stock on removal from the mold has often caused the washers to become displaced to such an extent as to cause the trouble outlined above. With the method set forth herein, however, the expansion of the stock takes place in the mold and as there is no expansion of the stock on the opening of the mold, the washers all remain in the exact positions at which they are fixed by the washer supporting pins. The result is that this is the first time that it has been possible, as a practical matter, to produce heels of a high grade blown rubber stock.

While a number of blowing agents may be used, it is preferred to employ one which generates nitrogen when it decomposes during the curing operation. It has been proposed to use inorganic materials which will react under heat, such for example as mixtures of sodium nitrite and ammonium acetate or sodium nitrite and ammonium chloride. These materials do not give as uniform or as fine cellular structure as many of the organic blowing agents which decompose to generate nitrogen and have been more recently made available to the rubber industry. Prominent among such blowing agents are the various dinitroso amino compounds, sold by du Pont and particularly that compound known as "Unicel ND." Diazoaminobenzene and the product sold by United States Rubber Company under the trade name "Celogen" (benzene sulfonyl hydrazide) are also used.

When the words "rubber" or "rubber-like" are used to describe the material from which the articles are made, these terms cover natural or reclaimed rubber, and synthetic rubbers of various types including butadiene copolymers and polychlorine plastics or the like, such as known in the trade as "neoprene." Other plastic materials having similar properties may be employed, including vinyl polymers or copolymers, such as B. F. Goodrich Company's "Geon 121" and a suitable plasticizer.

The full and complete description herein gives all of the details of the process which will enable one familiar with this art to practice the same. It will be understood, however, that having explained the principles of the invention, changes and modifications may be made without departing from the invention or sacrificing any of its benefits.

Figures 1, 2:
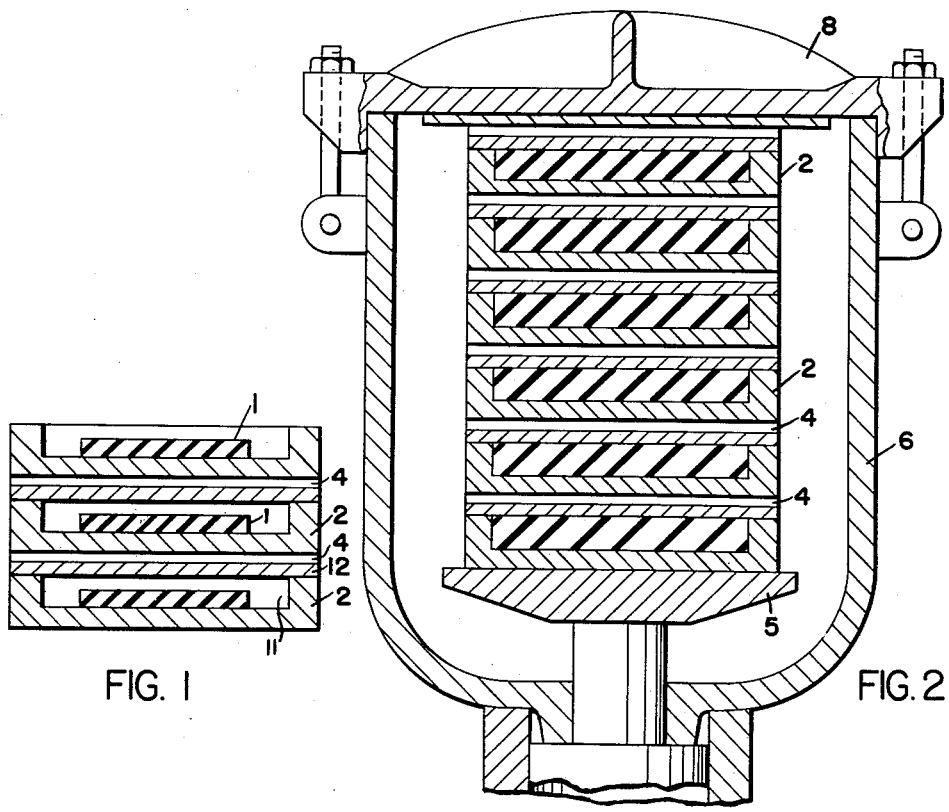
Fig. 1 is a typical mold in which the uncured stock is placed.
Fig. 2 is a view showing a stack of molds in an autoclave or heater of the vertical type in which the articles are cured.

No attempt has been made to show in Figs. 1 and 2 any particular type of mold and the molds shown in the drawings may be sole molds, molds for cushions, pads or mattresses, or any other articles, as the process is not limited to any particular objects. These molds are made with cavities of the exact size and shape of the finished article.

The stock which is used will contain the basic rubber or rubber-like material, as has been described above, with the correct proportions of fillers, plasticizers, antioxidants, coloring matter and the like as may be formulated by any one versed in the art of compounding rubber or analogous plastics. It is not necessary to enter into the details of the formulation for many variations are possible, as is well known. In the use of rubbers, a master batch of these ingredients is made in a Banbury mixer and, after mixing and aging the "master batch," to the stock is added sulphur, if the rubber material be vulcanizable, and the selected blowing agent. If the basic stock be of the so-called "neoprene" type, zinc oxide and the blowing agent will be added to the "master batch."

After the curing ingredients are added, the stock is rerun in a Banbury mixer and then sheeted out, and after the aging period is ready for the curing or vulcanizing operation.

In the case of synthetic resins the stock is run in a beater in which the powdered resin, plasticizer, fillers and blowing agent are added, the batch being of a syrupy consistency when the mixing operation is completed.

The amount of blowing agent to be employed is one factor which determines the density of the finished product, it being possible to determine exactly the amount of blowing agent for a finished article of any predetermined specific gravity. These matters are all within the rudimentary knowledge of any rubber compounder.

From the uncured sheets of rubber materials pieces or blocks of stock of the correct volume for each molding cavity are cut and are placed in the respective molding cavities. In using synthetic resins, a correct charge substantially less than the volume of the molding cavity, is placed in each cavity. Typical blocks of uncured rubber stock are indicated at 1 in Fig. 1 and are shown in molds 2 which may be conveniently stacked upon one another with cover plates 3 between the molds. The upper side of each mold is channeled as at 4 to allow for free circulation of the heating medium around each mold. As noted above, each mold cavity will be of the size and shape of the finished article.

It will be seen that the block or charge of uncured stock is substantially less in volume than the volume of the mold cavity. The size of the charge to be placed in each mold cavity is determined by the extent to which the stock is to be blown and the density desired for the finished product.

After a mold receives a charge of the uncured stock, it is tightly closed, and for this purpose individual molds may be bolted together or may be held in a powerful hydraulic press. It is essential that the molds do not open under the internal pressure developed by the decomposition of the blowing agent. For illustrating one method of holding the mold together, a stack of the molds is shown on the hydraulic ram 5 of an ordinary vertical heater or autoclave 6, the upper end of which is closed by a removable cover 8. The molds when placed in the heater and the cover closed are held between the ram and the cover under as much as 2000 lbs. pressure per square inch.

When the autoclave is closed steam under high pressure is admitted to the interior of the autoclave. The steam for curing rubber stocks is usually at from 50 to 60 lbs. and this high pressure steam not only supplies the requisite heat for decomposing the blowing agent and curing the stock but also prevents any of the stock oozing out through the cracks and crevices around the mold. During the curing process the blowing agent will decompose and cause the stock to contain millions of small, closed, non-communicating cells characteristic of cellular rubber. The expansion of the stock is shown in Fig. 2.

It is customary to heat the molds for approximately 20 minutes at the above temperature, which will insure the complete decomposition of the blowing agent and the curing of the stock. No set time is required, it being sufficient to specify that the stock be brought to its final or optimum cure while the mold is closed.

For synthetic resins the temperature and time for the resin to fuse will be governed by the particular resins. All of these factors may be readily determined.

The steam is now released from the autoclave while still maintaining the pressure upon the ram so that the molds do not open up while the stock is hot. The autoclave is then flooded with cooling water until the temperature of the articles reaches room temperature or approximately room temperature at which point the decomposition of the blowing agent will be arrested. Exact limits of cooling are not vital, the practice being to bring the temperature of the stock down to a point where it is no longer capable of expansion from the pressure of the internal gas when the molds are opened. As the stock is fully cured or set at the time the molds are opened and as the stock is then cooled, no expansion and no appreciable contraction will take place.

Figure 3:
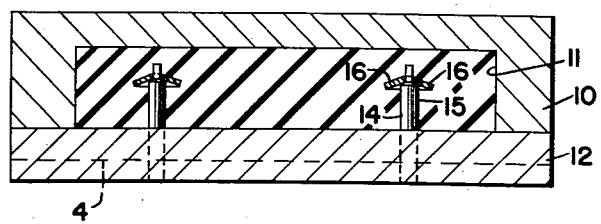
Fig. 3 is a cross section through one cavity of a multiple cavity heel mold showing the heel therein while curing.
Figure 4:
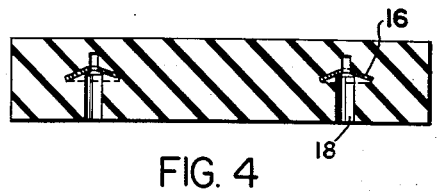
Fig. 4 is a cross section of a finished heel.

Referring to Figs. 3 and 4, a separable heel mold is shown at 10 and one of the cavities therein at 11. The cover plate is shown at 12. On the cover plate are the washer supporting pins 14 each having a shoulder 15 on which an individual washer 16 is placed before the stock is inserted in the mold. These pins are very accurately placed at the exact points where the nail holes 18 should be located in the finished heel. The location of the nail holes is determined by the templates which are furnished by the manufacturers of the nailing machines. With the present process the pins are located exactly as shown on the templates, it not being necessary to make any variations therefrom to compensate for any expansion of the stock due to "blowing" or shrinkage after removal from the mold.

It has been found that when a sole, heel or other article is made by the present process it will, under normal circumstances stay indefinitely at the exact dimensions of the mold cavity and will not vary therefrom during aging. In the case of heels this improves greatly upon usual nailing conditions. In the case of shoe soles there will be no separation due to shrinkage of the sole.

While the process has been described as more definitely pointed toward the manufacture of soles and heels, other numerous products made of cellular rubber or rubber-like compositions will be improved in like manner.

What is claimed is:

1. The method of manufacturing an article of a cellular plastic material, wherein said material is compounded with a gas generating agent therein and is charged into a separable mold in a volume substantially less than the volume of the mold cavity, comprising the steps of holding the mold tightly closed, applying heat to the mold to decompose the gas generating agent and expand the material to fill the mold cavity, and continuing the application of heat to the closed mold until the material is set, surrounding the mold during the heating thereof with fluid under pressure sufficient to prevent the material from seeping out of the separable mold during heating thereof, cooling the article in the mold while maintaining the mold closed to a degree of temperature such that the article will not expand from the pressure of said gas generating agent when the mold is opened, and opening the mold and removing the finished article.

2. The method of manufacturing an article of a cellular rubber-like material, wherein said material is compounded with a nitrogen gas generating agent therein and a piece thereof is placed into a separable mold in a volume substantially less than the volume of the mold cavity, comprising the steps of holding the mold tightly closed, applying heat to the mold to decompose the gas generating agent and expand the material to fill the mold cavity, and continuing the application of heat to the closed mold until the material is cured, surrounding the mold during the heating thereof with fluid under pressure sufficient to prevent the material from seeping out of the separable mold during heating thereof, cooling the article in the mold while maintaining the mold closed to a degree of temperature such that the article will not expand from the pressure of said gas generating agent when the mold is opened, and opening the mold and removing the finished article.

3. In a process of manufacturing resilient heels of a cellular plastic material, wherein said material is compounded with a gas generating agent therein, the steps of locating heel washers in a mold cavity at the exact locations the washers should occupy in the finished heel, placing a charge of said compounded material in the mold cavity, said charge being substantially less in volume than the volume of the mold cavity, closing the mold and holding it tightly closed, applying heat to the mold to decompose the gas generating agent and expand the material to fill the mold cavity, and continuing the application of heat to the closed mold until the material is set, surrounding the mold during the heating thereof with fluid under pressure sufficient to prevent the material from seeping out of the separable mold during heating thereof, cooling the article in the mold while maintaining the mold closed to a degree of temperature such that the article will not expand from the pressure of said gas generating agent when the mold is opened, and opening the mold and removing the finished article.

References Cited in the file of this patent

UNITED STATES PATENTS

| Number | Name | Date |
| --- | --- | --- |
| 1,269,229 | Smith | June 11, 1918 |
| 1,345,904 | Wisehart | July 6, 1920 |
| 1,415,437 | Gibbons | May 9, 1922 |
| 1,522,566 | Wiese | Jan. 13, 1925 |
| 1,615,156 | Batterman | Jan. 18, 1927 |
| 2,145,731 | Minor | Jan. 31, 1939 |
| 2,216,834 | Buskirk | Oct. 8, 1940 |
| 2,254,415 | Boyd | Sept. 2, 1941 |
| 2,297,022 | Pfleumer | Sept. 29, 1942 |
| 2,371,382 | Cuthbertson | Mar. 13, 1945 |
| 2,546,868 | Pfleumer | Mar. 27, 1951 |